United States Patent [19]
Biensan et al.

[11] Patent Number: 5,932,632
[45] Date of Patent: Aug. 3, 1999

[54] COMPOSITION FOR A POSITIVE ELECTRODE, A METHOD OF PREPARING SAID COMPOSITION, AND THE USE OF AN ORGANIC ACID COMPOUND FOR NEUTRALIZING LIOH

[75] Inventors: Philippe Biensan, Epinay Sur Orge; Odile Godiveau, Marcoussis; Bernard Simon, Issy les Moulineaux, all of France

[73] Assignee: Saft, Romanville, France

[21] Appl. No.: 08/904,017

[22] Filed: Jul. 31, 1997

[30] Foreign Application Priority Data

Aug. 2, 1996 [FR] France .................................. 96 09799

[51] Int. Cl.⁶ ...................................................... C09D 5/00
[52] U.S. Cl. ............................................................. 523/161
[58] Field of Search ............................................... 523/161

[56] References Cited

U.S. PATENT DOCUMENTS 3,897,450  7/1975  Horiguchi et al. .................... 260/314.5
5,472,490  12/1995  Sawamura et al. ..................... 106/413

OTHER PUBLICATIONS

Database WPI, Section CH, Week 9632, Derwent Publications Ltd., London, GB; Class A85, AN 96–314474 corresponding to JP 08 138 668 A (Nikko Rika KK) May 31, 1996.

Patent Abstracts of Japan, vol. 016, No. 472 (E–1272) Sep. 30, 1992 corresponding to JP 04 169065 A (Mitsubishi Electric Cor). dated Jun. 17, 1992.

*Primary Examiner*—Edward J. Cain
*Attorney, Agent, or Firm*—Sughrue, Mion, Zinn, Macpeak & Seas, PLLC

[57] ABSTRACT

The present invention relates to the use of an organic acid compound for substantially eliminating the presence of free LiOH in an ink composition for positive electrodes, wherein said organic acid compound is chosen from the set constituted by:

($\alpha$) $C_1$–$C_4$ carboxylic acids;

($\beta$) $C_2$–$C_4$ fluorocarboxylic acids;

($\gamma$) anhydrides thereof; and ($\delta$) mixtures thereof.

It also relates to a positive electrode ink containing said organic acid compound, and to a method of preparing said ink.

43 Claims, No Drawings

COMPOSITION FOR A POSITIVE ELECTRODE, A METHOD OF PREPARING SAID COMPOSITION, AND THE USE OF AN ORGANIC ACID COMPOUND FOR NEUTRALIZING LIOH

FIELD OF THE INVENTION

The present invention relates to the field of positive electrodes that are encountered mainly in lithium storage cells.

It relates more precisely to (i) a composition of an active material for a positive electrode, which composition contains a substance based on lithium, of structure $LiM_mO_{2m}$, where $M_m$ is Ni, Co, Mn, or $Mn_2$, and essentially exempt from free LiOH, (ii) a method of preparing said composition and of said active material, and (iii) the use of an organic acid compound for neutralizing the LiOH free base.

PRIOR ART

It is known that a positive electrode is formed of a support, in general a laminated support, both of whose faces are coated with active material. The support, which is referred to as a "current collector" or a "collector" by a person skilled in the art, is designed to be made of aluminum and is electrochemically inert. The coating on both of the faces of the current collector, which coating is referred to as the "active material" or the "active mixture" by a person skilled in the art, is constituted by a mixture of dry (or solid) materials resulting from a solvent being removed by evaporation. Conventionally, the active material comprises three essential ingredients: (A) a cathode active substance of structure $LiM_mO_{2m}$, (B) carbon, and (C) a binder; the composition A+B+C+D, where D is the solvent which is used for depositing the active material A+B+C, is referred to as "ink" by a person skilled in the art.

It is known that cathode active substances of structure $LiM_mO_{2m}$, for higher performance positive electrodes ($LiNiO_2$, $LiCoO_2$, $LiMnO_2$, $LiMn_2O_4$, etc.) are usually prepared from a compound (an oxide of formula $M_mO_{2m-1}$, a carbonate, or an acetate, etc. ) of the transition metal in question and of lithium hydroxide (LiOH).

To obtain good performance levels, it has until now been necessary to use a slight excess of lithium hydroxide relative to stoichiometric conditions, i.e. it has been necessary to operate in such manner that the molar ratio $LiOH/M_mO_{2m-1}$ (e.g. LiOH/NiO) is greater than 1. In that mode of operation, a certain quantity (generally a small quantity) of free lithium hydroxide remains both in the cathode active substance and in the active material, which is particularly undesirable as indicated below.

In the prior art, as illustrated in particular by Publication WO-A-92/18425, making an electrode by coating a conductive support (e.g. an aluminum collector) using a mixture of a cathode active substance $LiM_mO_{2m}$, of a polymer binder, of a solvent, and of a conductive filler in powder form (carbon black) involves:

(a) dissolving the binder in the solvent;

(b) adding the cathode active substance $LiM_mO_{2m}$, and a conductive filler in powder form to the resulting solution;

(c) homogenizing the resulting mixture;

(d) coating the support with the resulting homogeneous mixture (i.e. the above-mentioned "ink"); and (e) drying at a temperature suitable for removing said solvent;

or (a') obtaining a mixture of the cathode active substance $LiM_mO_{2m}$, of the conductive filler in powder form, and of the binder in powder form;

(b') adding the solvent to the resulting mixture, then implementing the above-mentioned steps (c), (d), and (e).

Unfortunately, (i) the presence of LiOH in the mixture obtained after above-mentioned step (b) or (b') causes the ink to thicken quite quickly, which means that the homogenization of step (c) is often imperfect, and (ii) the presence of free LiOH and/or of free Li coming from LiOH in the coating obtained after step (e) reduces the cycling efficiency of the positive electrodes.

The technical problem posed is to delay the thickening of the ink so that the "pot-life" of said ink is increased to correspond to at least 24 hours in air and/or at least 72 hours when protected from air.

To this end, several technical solutions to the problem have been studied by the Applicant, but they have proved to be ineffective:

thoroughly dehydrating all of the components of the coating composition makes it possible to delay thickening, but does not solve the problem when traces of water (in particular water vapor contained in air) are in contact with said coating composition;

replacing the binder, which is generally a PVDF (i.e. a polyvinylidene fluoride) with a copolymer of vinylidene fluoride and of an ethylenically unsaturated fluorine-containing compound (such as hexafluoro-propylene) is unsatisfactory on two counts: in the presence of free LiOH, that type of copolymer forms lumps and leads to poorer adhesion on the conductive support than the PVDF homopolymer; in addition, since that type of copolymer is more soluble than said PVDF homopolymer, the electrolyte solvents cause prohibitive electrode swelling which in particular results in a reduction in cohesion, a reduction in adhesion, and a reduction in intergranular contacts;

treating the lithium hydroxide with $CO_2$ to transform free LiOH into $Li_2CO_3$ is unsuitable because the film of $Li_2CO_3$ that forms and the $CO_2$ gas prevent the electrode from operating electrochemically; and neutralizing the lithium hydroxide with an inorganic acid, in particular contact between an $LiNiO_2$ compound (containing free LiOH) and gaseous HCl causes a lithium salt (LiCl) to form, thereby imparting poor performance to the support-and-coating assembly.

OBJECTS OF THE INVENTION

A new technical solution is proposed to solve the problem of increasing the pot-life so as to have a coating composition or ink for making positive electrodes that is sufficiently fluid when coating the support, whenever a thickened ink is unsuitable industrially for the coating technique. The industrial aim is to treat a large number of collectors, whereas extemporaneous preparations of the coating composition for positive electrodes make it possible to coat only a limited number of collectors, or even no collectors at all.

In a first aspect of the invention, a new use of means is proposed substantially eliminating the free lithium hydroxide from the composition of the ink for positive electrodes prior to coating and to drying.

In a second aspect of the invention, a new composition of the ink for positive electrodes is proposed that is essentially exempt from free LiOH.

In a third aspect of the invention a new method is proposed for preparing (i) said ink and (ii) the corresponding coating on a support.

SUMMARY OF THE INVENTION

The new technical solution provided by the invention to solve the difficulties of the prior art and the above-mentioned drawbacks is based on the use of an organic acid compound for substantially eliminating the free lithium hydroxide present in the ink for positive electrodes.

More precisely, the invention provides the use of an organic acid compound for substantially eliminating the presence of free LiOH by neutralization, wherein said organic acid compound is chosen from the set constituted by:

(α) $C_1$–$C_4$ carboxylic acids;
(β) $C_2$–$C_4$ fluorocarboxylic acids;
(γ) anhydrides thereof; and
(δ) mixtures thereof.

The use of said organic acid compound offers the advantage of (i) delaying thickening of the positive electrode ink, thereby increasing the pot-life of said ink, (ii) improving the cycling efficiency, and (iii) improving the adhesion of the coating as dried on its support.

According to the invention, the ink for a positive electrode comprises a cathode active substance of structure $LiM_mO_{2m}$, where $M_m$ is Ni, Co, or Mn when m is equal to 1 or $Mn_2$ when m is equal to 2, a filler in powder form, a polymer binder, and a solvent, and wherein said ink is essentially exempt from free LiOH, and it contains a lithium salt resulting from the reaction between the lithium hydroxide initially present in said cathode active substance, and an organic acid compound chosen from the set constituted by:

(α) $C_1$–$C_4$ carboxylic acids;
(β) $C_2$–$C_4$ fluorocarboxylic acids;
(γ) anhydrides thereof; and
(δ) mixtures thereof.

The method of preparing (i) the ink for a positive electrode and (ii) the coating constituted by the solid matter of said ink involves making a mixture constituted by a cathode active substance of structure $LiM_mO_{2m}$, where $M_m$ is Ni, Co, or Mn when m is equal to 1 or $Mn_2$ when m is equal to 2, by a conductive filler in powder form, by a polymer binder, and by a solvent, and wherein said method involves adding an organic acid compound chosen from the set constituted by:

(α) $C_1$–$C_4$ carboxylic acids;
(β) $C_2$–$C_4$ fluorocarboxylic acids;
(γ) anhydrides thereof; and
(δ) mixtures thereof;

before, at the same time as, or immediately after the solvent, to eliminate the free lithium hydroxide in the form of lithium salt with said organic acid compound.

Abbreviations

For reasons of convenience, the following abbreviations are used in the present description.

| | |
|---|---|
| AB | acetyl black; |
| EUC | ethylenically unsaturated compound; |
| HFP | hexafluoropropylene (other name: 1,1,2,3,3-haxafluoro-1-propene), of structure: |

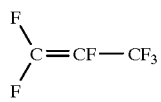

| | |
|---|---|
| $M_{COOH}$ | organic acid compound content (expressed in molar terms); |
| $M_{LiOH}$ | free lithium hydroxide content (expressed in molar terms); |
| $N_{COOH}$ | organic acid compound content (expressed in normal terms), for the volume unit in question: |

$$N_{COOH} = M_{COOH}/q$$

(where q is the number of carboxylic acid functions per molecule of organic acid compound, a mono-anhydride being considered herein to have two carboxylic acid functions);

| | |
|---|---|
| $N_{LiOH}$ | free lithium hydroxide content (expressed in normal terms) for the volume unit in question): |

$$N_{LiOH} = M_{LiOH}$$

| | |
|---|---|
| NMP | N-methylpyrrolidone, of structure: |

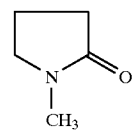

| | |
|---|---|
| NR | "neutralization rate" expressed as a percentage and represented relative to the initially present quantities of free lithium hydroxide and of organic acid compound that are caused to react, using the following equation: |

$$NR = 100\frac{N_{COOH}}{N_{LiOH}} = 100\frac{1}{q}\frac{M_{COOH}}{M_{LiOH}}$$

| | |
|---|---|
| | (where q is defined as indicated above) |
| PL | pot-life; |
| PVDF | polyvinylidene fluoride, a homopolymer of structure: |

$$-\!\!\left[CH_2-CF_2\right]_{\overline{m}}\!\!-$$

| | |
|---|---|
| VF2 | vinylidene fluoride (other name 1,1-difluoroethylene), of structure: |

$$H_2C = CF_2$$

| | |
|---|---|
| VF2/HFP | copolymer of vinylidene fluoride and of hexafluoropropylene comprising the following structural units: |

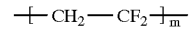

DETAILED DESCRIPTION OF THE INVENTION

The phrase "ink essentially exempt from free LiOH" is used herein to mean a composition which (i) contains no LiOH, $LiOH.H_2O$ hydrate, $Li_2O$ oxide (which might be transformed into LiOH or $LiOH.H_2O$ in the presence of the humidity in the air), or free Li coming from LiOH, or (ii) contains very small traces of LiOH, $LiOH.H_2O$, or $Li_2O$ (approximately less than 50 ppm or better still a quantity less than or equal to 10 ppm by weight or even 1 ppm by weight relative to the weight of the cathode active substance $LiM_mO_{2m}$), or of free Li coming from LiOH.

Following on from the above definition, the phrase "substantially eliminating the presence of LiOH" is used to mean (i) removing all the free LiOH, LiOH.H$_2$O, or Li$_2$O. (and the Li coming from LiOH), or (ii) reducing the free LiOH, LiOH.H$_2$O, or Li$_2$O content (and the resulting free Li content) to a value approximately less than 50 ppm or better still less than or equal to 10 ppm or even 1 ppm relative to the weight of the cathode active substance LiM$_m$O$_{2m}$.

After reacting with lithium hydroxide, the organic acid compound, which, as indicated above, is an organic substance chosen from the set constituted by C$_1$–C$_4$ carboxylic acids, C$_2$–C$_4$ fluorocarboxylic acids, anhydrides thereof, and mixtures thereof, gives a lithium salt that does not disturb subsequent operation of the electrode, in particular in the final storage cell.

Among the carboxylic acids that are suitable for this purpose, mention may be made in particular of (i) C$_1$–C$_4$ monocarboxylic acids of structure R$_1$COOH, where R$_1$ is H or a C$_1$–C$_3$ alkyl, such as HCOOH, CH$_3$COOH, CH$_3$CH$_2$COOH, (CH$_3$)$_2$CHCOOH, and (ii) C$_2$–C$_4$ polycarboxylic acids, in particular diacids such as HOOC—COOH, HOOC—CH$_2$—COOH and HOOC—CH$_2$CH$_2$—COOH.

Among the C$_2$–C$_4$ fluorocarboxylic acids that are suitable for the invention, mention may be made in particular of fluoromonocarboxylic acids and fluoropolycarboxylic acids which can be derived from the above-mentioned acids by replacing at least one hydrogen atom, in a C—H bond, with a fluorine atom, in particular the following monoacids and diacids: CH$_2$FCOOH, CHF$_2$COOH, CF$_3$COOH, CF$_3$CH$_2$COOH, HOOC—CF$_2$—COOH. In practice, perfluorinated acids are preferred among fluorocarboxylic acids.

Among the anhydrides that are suitable for the invention, mention may be made in particular of "normal" anhydrides obtained from the same monoacid, mixed anhydrides obtained from two different monoacids, and cyclic anhydrides obtained from the same diacid. Acetic anhydride is preferred among these anhydrides.

Advantageously, the organic acid compound of the invention is preferably chosen from oxalic acid (HOOC—COOH), formic acid (HCOOH), acetic anhydride, and above all acetic acid (CH$_3$COOH) or trifluoroacetic acid (CF$_3$COOH).

The cathode active substance is a product obtained by causing LiOH (in excess relative to stoichiometric conditions as indicated above) to react with a transition metal oxide of formula M$_m$O$_{2m-1}$, (where in particular M$_m$ is Ni, Co, Mn, or Mn$_2$) or a salt (in particular a carbonate or acetate) of said transition metal. Said cathode active substance approximately satisfies the formula LiM$_m$O$_{2m}$ and, depending on the method used to prepare it, it contains free lithium hydroxide or free Li$_2$O that can give LiOH and/or LiOH.H$_2$O by hydrolysis.

According to the invention, the polymer binder used may be any binder suitable for making it possible to coat a conductive support involved in storage cell manufacture. Such a binder is principally a product obtained by polymerizing or co-polymerizing an ethylenically unsaturated monomer (that optionally contains a halogen, preferably fluorine).

Preferably, this binder is prepared from at least one monomer: VF2. It is either a PVDF homopolymer or a VF2/EUC copolymer, where the EUC may be halogenated or better still fluorinated. By way of example, the EUC monomer may satisfy the following formula:

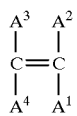

where A$^1$, A$^2$, A$^3$, and A$^4$, which are identical or different, represent H, F, C$_1$–C$_4$ alkyl, or C$_1$–C$_4$ fluoroalkyl.

According to the invention, the preferred EUC monomers are those in which A$^1$=CF$_3$ or CF$_3$CF$_2$, A$^2$=A$^3$=F, and A$^4$=F or CF$_3$, i.e. perfluorinated ethylenically unsaturated compounds. According to the invention, the most advantageous EUC is HFP.

Particularly advantageously, the binder of the invention is chosen from the set constituted by PVDF homopolymer, VF2/HFP copolymer (their structures are given above), and mixtures thereof. PVDF and VF2/HFP are involved as binders serving to stabilize the structure of the final coating after drying.

As a solvent for the polymer binder, which is useful according to the invention, any substance can be used that is known for making the binder of ink for positive electrodes soluble. The preferred solvents are those which (i) have a boiling point lying approximately in the range 100° C. to 200° C. at atmospheric pressure (about 10$^5$ Pa), and (ii) do not react or do not react very much with the other ingredients of ink for positive electrodes, or with the conductive support which is subsequently coated with said ink. By way of example, it is possible to use solvents that satisfy the following formula:

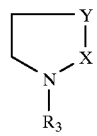

in which R$_3$ is CH$_3$, and one of X and Y is C=O and the other is CH$_2$ or CH$_2$CH$_2$, the preferred solvents of the invention being N-methyl-2-piperidone (R$_3$—CH$_3$, X=CO, and Y=CH$_2$CH$_2$), and above all N-methyl-2-pyrrolidone or NMP (R$_3$=CH$_3$, X—Co, and Y—CH$_2$).

The conductive filler in powder form of the invention is of small grain size (in particular of grain size less than 50 μm, preferably less than or equal to 20 μm, and better still lying approximately in the range 15 μm to 0.3 μm), and is constituted by carbon. The conductive filler in powder form may be graphite, carbon black, acetylene black (AB), soot, or a mixture thereof.

Advantageously, according to the invention, the conductive filler in powder form is constituted by a graphite/AB mixture in a weight ratio lying in the range 4/1 to 1/4.

According to the invention, as indicated above, in association with:

(1) the main mixture constituted by:
    (A) the cathode active substance;
    (B) the conductive filler in powder form;
    (C) the polymer binder; and
    (D) the solvent for said binder;
    the ink for positive electrodes contains:
(2) the lithium salt resulting from the reaction between:
    (E) the organic acid compound; and
    the free lithium hydroxide present in said cathode active substance, so that said ink is substantially exempt from free lithium hydroxide.

Said organic acid compound is added to said main mixture before, after, or at the same time as the solvent of the binder, in a quantity such that the neutralization rate (NR), expressed in percentage and given by the following relationship:

$$NR = 100 \frac{1}{q} \frac{M_{COOH}}{M_{LiOH}} \quad (I)$$

where $M_{LiOH}$ is the initially present free lithium hydroxide content, expressed in molar terms;

$M_{COOH}$ is the organic acid compound content, expressed in molar terms; and q is the number of carboxylic acid functions per molecule of said organic acid compound;

is greater than or equal to 50% and preferably lies in the range 100% to 150%.

The above-defined relationship I is equivalent to the following relationship:

$$NR = 100 \frac{N_{COOH}}{N_{LiOH}} \quad (II)$$

given above in the list of abbreviations.

When 100%≦NR, and better still when 100%≦NR≦150%, all of the free lithium hydroxide coming from the cathode active substance is removed from the ink for positive electrodes, and a composition is obtained whose thickening is delayed, given the values:

PL≧24 hours in air; and

PL≧72 hours protected from air.

The positive electrode ink of the invention is suitable for coating conductive supports in that it is sufficiently fluid to flow under gravity. Its consistency ranges from that of a syrup to that of a fluid paste. In practice, at atmospheric pressure (about $10^5$ Pa) and at ambient temperature (15° C. to 25° C.), said composition has viscosity less than 300 Pa.s (300,000 cPs), in particular viscosity lying in the range 2 Pa.s to 20 Pa.s (2,000 cPs to 20,000 cPs) and better still viscosity lying in the range 5 Pa.s to 7 Pa.s (5,000 cPs to 7,000 cPs).

Advantageously, the ink (i.e. the coating composition) of the invention may contain:

(1) for 100 parts by weight of active material A+B+C:

(A) 85 parts by weight to 96 parts by weight of cathode active substance of structure $LiM_mO_{2m}$, where $M_m$ is Ni, Co, or Mn when m is equal to 1 or $Mn_2$ when m is equal to 2;

(B) 8 parts by weight to 1 part by weight of conductive filler in powder form constituted by carbon and preferably by a graphite/AB mixture of weight ratio in the range 4/1 to 1/4;

(C) 7 parts by weight to 3 parts by weight of polymer binder prepared from VF2 monomer, said binder being PVDF or VF2/HFP; and (D) a solvent of said binder, preferably NMP, in a quantity such that the weight ratio D/A+B+C+D lies in the range 0.3 to 0.7; and (2) the salt resulting from the reaction between the free lithium hydroxide and (E) said organic acid compound in a quantity corresponding to an NR greater than or equal to 50% and better still in the range 100% to 150%.

The binder solvent content in the coating composition is not essentially critical, and since it suffices to use as small a quantity of solvent as possible given the PL, the desired consistency, and the limiting of the energy consumed to evaporate said solvent, a composition is recommended in a variant that contains:

(1) for the main mixture A+B+C+D:

(A) at least 86% by weight, relative to the weight of the mixture A+B+C, of cathode active substance of structure $LiM_mO_{2m}$, where $M_m$ is Ni, Co, or Mn when m is equal to 1 or $Mn_2$ when m is equal to 2;

(B) no more than 8% by weight, relative to the weight of the mixture A+B+C, of conductive filler in powder form constituted by carbon and preferably by a graphite/AB mixture of weight ratio in the range 4/1 to 1/4;

(C) no more than 6% by weight, relative to the weight of the mixture A+B+C, of polymer binder prepared from VF2, said binder being PVDF or VF2/HFP; and (D) the solvent of said binder, preferably NMP, in a quantity sufficient for the mixture A+B+C+D+E to have viscosity lying in the range 2 Pa.s to 20 Pa.s, and preferably viscosity lying in the range 5 Pa.s to 7 Pa.s, under atmospheric pressure and at ambient temperature; and (2) the salt resulting from the reaction between the free lithium hydroxide and (E) said organic acid compound in a quantity corresponding to an NR greater than or equal to 50% and better still in the range 100% to 150%.

According to the invention, it is preferable for the content of cathode active substance A to be not less than 86% by weight relative to the weight of the mixture A+B+C so as to minimize the influence of the components B and C that are not electrochemically active while said support as coated on both of its faces and rolled up is operating as a storage cell.

The method of preparing (i) the ink for positive electrodes, and (ii) the corresponding coating of active material involves:

(i) for obtaining the ink:

either:

(a) dissolving the binder in the solvent with the organic acid compound;

(b) adding the cathode active substance $LiM_mO_{2m}$ and a conductive filler in powder form to the resulting solution; and (c) homogenizing the resulting mixture;

or:

(a') obtaining a mixture of the cathode active substance $LiM_mO_{2m}$, of the conductive filler in powder form, and of the binder in powder form;

(b') adding the organic acid compound to the resulting mixture before, at the same time as, or immediately after the solvent; and (c) homogenizing the resulting mixture;

then:

(ii) for obtaining the coating of active material:

(d) coating the support with the resulting homogeneous mixture (i.e. ink); and (e) drying at a temperature in the range 100° C. to 200° C. to remove said solvent;

so that said composition, and as a result said coating are exempt from free lithium hydroxide, and from free lithium coming from said lithium hydroxide.

The preferred implementation of the method of the invention consists, for obtaining said composition, in preparing a mixture of:

(A) 86% by weight of cathode active substance, relative to the weight of the mixture A+B+C;

(B) 8% by weight, relative to the weight of the mixture A+B+C, of conductive filler in powder form constituted by a graphite/AB mixture of weight ratio in the range 4/1 to 1/4; and (C) 6% by weight of polymer binder, relative to the weight of the mixture A+B+C, said binder being PVDF or VF2/HFP; and in incorporating the following into the resulting mixture:

(D) the solvent of said polymer binder, preferably NMP; and (E) said organic acid compound, said organic acid compound being used in a quantity corresponding to an NR in the range 100% to 150%, and incorporated at the same time as the solvent of the polymer, said solvent being used in a quantity such that the mixture A+B+C+D+E has a syrupy consistency (2 Pa.s to 20 Pa.s).

Other advantages and characteristics of the invention will be better understood on reading the following description of implementations and of results of comparative trials. Naturally, all of these elements are given by way of non-limiting illustration.

EXAMPLE 1

An "ink" was prepared of consistency that was pasty but fluid enough to enable the ink to flow under gravity, the ink being prepared by means of the above-defined preferred implementation, using:

(A) 86% by weight, relative to the weight of the mixture A+B+C, of $LiNiO_2$ (containing 0.3 millimoles of fee LiOH per mole of LiOH);

(B) 8% by weight, relative to the weight of the mixture A+B+C, of conductive filler in powder form constituted by a graphite/AB mixture of weight ratio 1/1;

(C) 6% by weight, relative to the weight of the mixture A+B+C, of PVDF;

(D) NMP until the consistency of thick syrup (5 Pa.s) was obtained; and (E) $CH_3COOH$ in a quantity sufficient for an NR of 150%.

Both faces of a current collector constituted by a strip of aluminum foil that was 20 μm thick were coated with the resulting ink. The resulting electrode was then dried at a temperature enabling the solvent to be removed completely, the temperature lying in the range 100° C. to 180° C. and preferably in the range 120° C. to 150° C. The electrode was then compressed such that the final thickness of the paste deposited on each face was in the range 50 μm to 400 μm, e.g. in the range 90 μm to 100 μm. The finished electrode then had a total thickness in the range 200 μm to 220 μm. It was then used as the positive electrode of a storage cell.

In a variant, it is possible to coat a first face of the collector, to dry it so as to evaporate NMP, then to coat the second face and to dry it. The electrode is then compressed (calendered) to obtain the desired thickness.

OTHER EXAMPLES

Other examples of the invention (Ex 2 to Ex 4) and comparison products (CP1–CP2) were prepared using the modes of operation described in Example 1 above, while varying the NR (i.e. the quantity of organic acid compound used), and the type of the polymer binder (PVDF or VF2/HFP). These examples and comparison products are given in Table I below.

Trials I—PL—

The PL values were evaluated for the coating compositions Ex. 1 to Ex. 4 and CP1 & CP2. The results obtained and given in Table I show that adding an organic acid compound increases the pot-life of inks of the invention.

TABLE I

| Product | A | Binder | NR | PL |
|---------|---|--------|-----|------|
| Ex 1 | a | PVDF | 150% | >200 h |
| Ex 2 | b | VF2/HFP | 100% | 30 h |
| Ex 3 | b | VF2/HFP | 75% | 26 h |
| Ex 4 | b | VF2/HFP | 50% | 14 h |
| CP1 | a | PVDF | 0% | <<1 h |
| CP2 | a | VF2/HFP | 0% | 1 h |

Notes
A: mode of storing the composition
(a) in air
(b) protected from air

Trials II—Adhesion—

The peel strength was evaluated on the electrodes so as to assess the adhesion of the coated compositions on one face of each electrode. The results obtained are given in Table II below. Surprisingly, it can be observed that adding an organic acid compound increases adhesion.

TABLE II

| Product | Binder | NR | Adhesion (MPa) |
|---------|--------|-----|----------------|
| Ex 1 | PVDF | 150% | 1–2 |
| CP1 | PVDF | 0% | 0.5–0.7 |

Trials III—Cycling efficiency—

The electrodes obtained were used to form lithium anode button cells (Li/$LiNiO_2$ configuration) and the button cells were cycled in the range 3 V to 4.1 V. The cycling efficiency, measured by the ratio between the capacity charged and the capacity discharged during the same cycle, was determined. The results given in Table III below show that adding an organic acid compound improves the cycling efficiency.

TABLE III

| Product | Binder | NR | Cycling efficiency charge/discharge (%) |
|---------|--------|-----|-----------------------------------------|
| Ex 1 | PVDF | 150% | 99.5–99.9 |
| CP2 | VF2/HFP | 0% | 98–99 |
| CP1 | PVDF | 0% | 98–99 |

We claim:

1. A method for substantially eliminating the presence of free LiOH in an ink to be used as an active material for a positive electrode, comprising
   providing an ink containing LiOH, and
   contacting said ink with a sufficient quantity of an organic acid compound to react with essentially all said LiOH, thereby forming a lithium salt, wherein said organic acid compound is chosen from the set constituted by:
   (α) $C_1$–$C_4$ carboxylic acids;
   (β) $C_2$–$C_4$ fluorocarboxylic acids;
   (γ) anhydrides of (α) and (β); and
   (δ) mixtures of any of (α), (β) or (γ).

2. The method according to claim 1, wherein said organic acid compound is a $C_1$–$C_4$ monocarboxylic acid or a $C_2$–$C_4$ polycarboxylic acid.

3. The method according to claim 1, wherein said organic acid compound is oxalic acid, formic acid, or acetic anhydride, acetic acid or trifluoroacetic acid.

4. An ink for a positive electrode, said ink comprising, as a main mixture, a cathode active substance of structure $LiM_mO_{2m}$, where $M_m$ is Ni, Co, or Mn when m is equal to 1 or $Mn_2$ when m is equal to 2, a filler in powder form, a polymer binder, and a solvent, wherein said ink is essentially exempt from free LiOH, a lithium salt resulting from a reaction between free lithium hydroxide initially present in said cathode active substance, and an organic acid compound chosen from the set constituted by:

(α) $C_1$–$C_4$ carboxylic acids;

(β) $C_2$–$C_4$ fluorocarboxylic acids;

(γ) anhydrides (α) and (β); and (δ) mixtures of any of (α) (β) or (γ).

5. The ink according to claim 4, wherein, in association with:

(1) the main mixture constituted by:
   (A) the cathode active substance;
   (B) the filler in powder form;
   (C) the polymer binder; and
   (D) the solvent for said binder;
   the ink contains:
(2) the lithium salt resulting from the reaction between:
   (E) the organic acid compound; and
the free lithium hydroxide present in said cathode initially active substance, so that said ink is substantially exempt from free lithium hydroxide;

said acid having been used in a quantity such that the neutralization rate, expressed in percentage and given by the following relationship:

$$NR = 100 \frac{1}{q} \frac{M_{COOH}}{M_{LiOH}} \quad (I)$$

where
$M_{LiOH}$ is the initially present free lithium hydroxide content, expressed in molar terms;
$M_{COOH}$ is the organic acid compound content, expressed in molar terms; and
q is the number of carboxylic acid functions per molecule of said organic acid compound;
is greater than or equal to 50%.

6. The ink according to claim 4, wherein said organic acid compound is a $C_1$–$C_4$ monocarboxylic acid or a $C_2$–$C_4$ polycarboxylic acid.

7. The ink according to claim 4, wherein said organic acid compound is oxalic acid, formic acid, acetic anhydride, acetic acid or trifluoroacetic acid.

8. The ink according to claim 4, wherein said binder is obtained by polymerizing at least one monomer, vinylidene fluoride, and is chosen from the set constituted by:
a polyvinylidene fluoride homopolymer;
a copolymer of vinylidene fluoride and an ethylenically unsaturated fluorine-containing monomer compound; and
mixtures of said homopolymer and said copolymer.

9. The ink according to claim 4, wherein said solvent is N-methylpyrrolidone.

10. An ink according to claim 4, containing:
(1) for 100 parts by weight of active material A+B+C:
   (A) 85 parts by weight to 96 parts by weight of cathode active substance of structure $LiM_mO_{2m}$, where $M_m$ is Ni, CO, or Mn when m is equal to 1 or $Mn_2$ when m is equal to 2;
   (B) 8 parts by weight to 1 part by weight of conductive filler in powder from comprising carbon and having a a graphite/AB mixture of weight ratio in the range 4/1 to 1/4;
   (C) 7 parts by weight to 3 parts by weight of polymer binder prepared from VF2 monomer, said binder being PVDF or VF2/HFP; and
   (D) a solvent of said binder, in a quantity such that the weight ratio D/A+B+C+D lies in the range 0.3 to 0.7; and
(2) the salt resulting from the reaction between the free lithium hydroxide and
   (E) said organic acid compounding in a quantity corresponding to an NR greater than or equal to 50%.

11. The ink according to claim 4, containing:
(1) for the main mixture A+B+C+D:
   (A) at least 86% by weight, relative to the weight of the mixture A+B+C, of cathode active substance of structure $LiM_mO_{2m}$, where $M_m$ is Ni, Co, or Mn when m is equal to 1 or $Mn_2$ when m is equal to 2;
   (B) no more than 8% by weight, relative to the weight of the mixture A+B+C, of conductive filler in powder form comprising carbon and having a graphite/AB mixture of weight ratio in the range 4/1 to 1/4;
   (C) no more than 6% by weight, relative to the weight of the mixture A+B+C, of polymer binder prepared from VF2, said binder being PVDF or VF2/HFP; and
   (D) the solvent of said binder, in a quantity sufficient for the mixture A+B+C+D+E to have viscosity lying in the range 2 Pa.s to 20 Pa.s, under atmospheric pressure and at ambient temperature; and
(2) the salt resulting from the reaction between the free lithium hydroxide and
   (E) said organic acid compound in a quantity corresponding to an NR greater than or equal to 50%.

12. A composition according to claim 4, having a pot-life greater than or equal to 24 hours in air and greater than or equal to 72 hours when protected from air.

13. A method of preparing an ink for a positive electrode, to be used as a coating of active material, said method comprising preparing a main mixture comprising a cathode active substance of structure $LiM_mO_{2m}$, where $M_m$ is Ni, Co, or Mn when m is equal to 1 or $Mn_2$ when m is equal to 2, a conductive filler in powder form, a polymer binder, and a solvent, and adding an organic acid compound chosen from the set constituted by:

(α) $C_1$–$C_4$ carboxylic acids;

(β) $C_2$–$C_4$ fluorocarboxylic acids;

(γ) anhydrides of (α) and (β); and (δ) mixtures of any of (α), (β) or (δ)

before, at the same time as, or immediately after the solvent is added to the main mixture, to eliminate the free lithium hydroxide in the form of lithium salt with said organic acid compound.

14. The method according to claim 13, comprising:

(i) for obtaining the ink:
either:
   (a) dissolving the binder in the solvent with the organic acid compound;
   (b) adding the cathode active substance $LiM_mO_{2m}$ and a conductive filler in powder form to the resulting solution; and
   (c) homogenizing the resulting mixture;
or:
   (a') obtaining a mixture of the cathode active substance $LiM_mO_{2m}$, the conductive filler in powder form, and the binder in powder form;

(b') adding the organic acid compound to the resulting mixture before, at the same time as, or immediately after the solvent; and (c) homogenizing the resulting mixture;

then:

(ii) for obtaining the coating of active material:

(d) coating a support with the resulting homogeneous mixture; and (e) drying at a temperature in the range 100° C. to 200° C. to remove said solvent;

so that said ink, and as a result said coating are exempt from free lithium hydroxide, and from free lithium coming from said lithium hydroxide.

15. The method according to claim 13, comprising, for obtaining the ink, preparing a mixture of:

(A) 86% by weight of cathode active substance, relative to the weight of the mixture A+B+C;

(B) 8% by weight, relative to the weight of the mixture A+B+C, of conductive filler in powder form comprising a graphite/AB mixture of weight ratio in the range 4/1 to 1/4; and (C) 6% by weight of polymer binder, relative to the weight of the mixture A+B+C, said binder being PVDF homopolymer or VF2/HFP copolymer; and then incorporating the following into the resulting mixture;

(D) the solvent of said polymer binder; and (E) said organic acid compound, said organic acid compound being used in a quantity corresponding to an NR in the range 100% to 150%, and incorporated at the same time as the solvent of the polymer, said solvent being used in a quantity such that the mixture A+B+C+D+E has a consistency in the range 2 Pa.s to 20 Pa.s under atmospheric pressure and at ambient temperature.

16. The ink according to claim 5, wherein said neutralization rate lies in the range 100% to 150%.

17. The ink according to claim 8, wherein said ethylenically unsaturated fluorine-containing monomer compound is hexafluoropropylene.

18. The ink according to claim 11, wherein said viscosity lies in the range 5 Pa.s to 7 Pa.s.

19. The method according to claim 15, wherein said solvent is NMP.

20. A positive electrode comprising a support having been coated with a composition of an active material, said composition comprising, as a main mixture, a cathode active substance of structure $LiM_mO_{2m}$, where $M_m$ is Ni, Co, or Mn when m is equal to 1 or $Mn_2$ when m is equal to 2, a filler in powder form, a polymer binder, and a solvent, wherein said composition is essentially exempt from free LiOH, a lithium salt resulting from a reaction between free lithium hydroxide initially present in said cathode active substance, and an organic acid compound chosen from the set constituted by:

(α) $C_1$–$C_4$ carboxylic acids;

(β) $C_2$–$C_4$ fluorocarboxylic acids;

(γ) anhydrides (α) and (β); and (δ) mixtures of any of (α), (β) or (γ).

21. The positive electrode according to claim 20, wherein, in association with:

(1) the main mixture constituted by:

(A) the cathode active substance;

(B) the filler in powder form;

(C) the polymer binder; and (D) the solvent;

the composition contains:

(2) the lithium salt resulting from the reaction between:

(E) the organic acid compound; and the free lithium hydroxide initially present in said cathode active substance, so that said composition is substantially exempt from free lithium hydroxide;

said acid having been used in a quantity such that the neutralization rate, expressed in percentage and given by the following relationship:

$$NR = 100 \frac{1}{q} \frac{M_{COOH}}{M_{LiOH}} \quad (I)$$

wherein $M_{LiOH}$ is the initially present free lithium hydroxide content, expressed in molar terms;

$M_{COOH}$ is the organic acid compound content, expressed in molar terms; and q is the number of carboxylic acid functions per molecule of said organic acid compound; is greater than or equal to 50%.

22. The positive electrode according to claim 20, wherein said organic acid compound is a $C_1$–$C_4$ monocarboxylic acid or a $C_2$–$C_4$ polycarboxylic acid.

23. The positive electrode according to claim 20, wherein said organic acid compound is oxalic acid, formic acid, acetic anhydride, acetic acid or trifluoroacetic acid.

24. The positive electrode according to claim 20, wherein said binder is obtained by polymerizing at least one monomer, vinylidene fluoride, and is chosen from the set constituted by:

a polyvinylidene fluoride homopolymer;

a copolymer of vinylidene fluoride and an ethylenically unsaturated fluorine-containing monomer compound; and mixtures of said homopolymer and said copolymer.

25. The positive electrode according to claim 20, wherein said solvent is N-methylpyrrolidone.

26. The positive electrode according to claim 20, wherein said composition contains:

(1) for 100 parts by weight of active material A+B+C:

(A) 85 parts by weight to 96 parts by weight of cathode active substance of structure $LiM_mO_{2m}$, where $M_m$ is Ni, CO, or Mn when m is equal to 1 or $Mn_2$ when m is equal to 2;

(B) 8 parts by weight to 1 part by weight of conductive filler in powder from comprising carbon and having a a graphite/AB mixture of weight ratio in the range 4/1 to 1/4;

(C) 7 parts by weight to 3 parts by weight of polymer binder prepared from VF2 monomer, said binder being PVDF or VF2/HFP; and (D) a solvent of said binder, in a quantity such that the weight ratio D/A+B+C+D lies in the range 0.3 to 0.7; and (2) the salt resulting from the reaction between the free lithium hydroxide and (E) said organic acid compounding in a quantity corresponding to an NR greater than or equal to 50%.

27. The positive electrode according to claim 20, wherein said composition contains:

(1) for the main mixture A+B+C+D:

(A) at least 86% by weight, relative to the weight of the mixture A+B+C, of cathode active substance of structure $LiM_mO_{2m}$, where $M_m$ is Ni, Co, or Mn when m is equal to 1 or $Mn_2$ when m is equal to 2;
(B) no more than 8% by weight, relative to the weight of the mixture A+B+C, of conductive filler in powder form comprising carbon and having a graphite/AB mixture of weight ratio in the range 4/1 to 1/4;
(C) no more than 6% by weight, relative to the weight of the mixture A+B+C, of polymer binder prepared from VF2, said binder being PVDF or VF2/HFP; and
(D) the solvent of said binder, in a quantity sufficient for the mixture A+B+C+D+E to have viscosity lying in the range 2 Pa.s to 20 Pa.s, under atmospheric pressure and at ambient temperature; and
(2) the salt resulting from the reaction between the free lithium hydroxide and
(E) said organic acid compound in a quantity corresponding to an NR greater than or equal to 50%.

28. The positive electrode according to claim 20, wherein said composition has a pot-life greater than or equal to 24 hours in air and greater than or equal to 72 hours when protected from air.

29. The positive electrode according to claim 21, wherein said neutralization rate lies in the range 100% to 150%.

30. The positive electrode according to claim 24, wherein said ethylenically unsaturated fluorine-containing monomer compound is hexafluoropropylene.

31. The positive electrode according to claim 27, wherein said viscosity lies in the range 5 Pa.s to 7 Pa.s.

32. A storage cell comprising a positive electrode comprising a support having been coated with a composition of an active material, said composition comprising, as a main mixture, a cathode active substance of structure $LiM_mO_{2m}$, where $M_m$ is Ni, Co, or Mn when m is equal to 1 or $Mn_2$ when m is equal to 2, a filler in powder form, a polymer binder, and a solvent, wherein said composition is essentially exempt from free LiOH, a lithium salt resulting from a reaction between free lithium hydroxide initially present in said cathode active substance, and an organic acid compound chosen from the set constituted by:
(α) $C_1$–$C_4$ carboxylic acids;
(β) $C_2$–$C_4$ fluorocarboxylic acids;
(γ) anhydrides (α) and (β); and
(δ) mixtures of any of (α), (β) or (γ).

33. The storage cell according to claim 32, wherein, in association with:
(1) the main mixture constituted by:
(A) the cathode active substance;
(B) the filler in powder form;
(C) the polymer binder; and
(D) the solvent;
the composition contains:
(2) the lithium salt resulting from the reaction between:
(E) the organic acid compound; and
the free lithium hydroxide initially present in said cathode active substance, so that said composition is substantially exempt from free lithium hydroxide;
said acid having been used in a quantity such that the neutralization rate, expressed in percentage and given by the following relationship:

$$NR = 100 \frac{1}{q} \frac{M_{COOH}}{M_{LiOH}} \quad (I)$$

wherein
$M_{LiOH}$ is the initially present free lithium hydroxide content, expressed in molar terms;

$M_{COOH}$ is the organic acid compound content, expressed in molar terms; and q is the number of carboxylic acid functions per molecule of said organic acid compound; is greater than or equal to 50%.

34. The storage cell according to claim 32, wherein said organic acid compound is a $C_1$–$C_4$ monocarboxylic acid or a $C_2$–$C_4$ polycarboxylic acid.

35. The storage cell according to claim 32, wherein said organic acid compound is oxalic acid, formic acid, acetic anhydride, acetic acid or trifluoroacetic acid.

36. The storage cell according to claim 32, wherein said binder is obtained by polymerizing at least one monomer, vinylidene fluoride, and is chosen from the set constituted by:
a polyvinylidene fluoride homopolymer;
a copolymer of vinylidene fluoride and an ethylenically unsaturated fluorine-containing monomer compound; and
mixtures of said homopolymer and said copolymer.

37. The storage cell according to claim 32, wherein said solvent is N-methylpyrrolidone.

38. The positive electrode according to claim 32, wherein said composition contains:
(1) for 100 parts by weight of active material A+B+C:
(A) 85 parts by weight to 96 parts by weight of cathode active substance of structure $LiM_mO_{2m}$, where $M_m$ is Ni, CO, or Mn when m is equal to 1 or $Mn_2$ when m is equal to 2;
(B) 8 parts by weight to 1 part by weight of conductive filler in powder from comprising carbon and having a a graphite/AB mixture of weight ratio in the range 4/1 to 1/4;
(C) 7 parts by weight to 3 parts by weight of polymer binder prepared from VF2 monomer, said binder being PVDF or VF2/HFP; and
(D) a solvent of said binder, in a quantity such that the weight ratio D/A+B+C+D lies in the range 0.3 to 0.7; and
(2) the salt resulting from the reaction between the free lithium hydroxide and
(E) said organic acid compounding in a quantity corresponding to an NR greater than or equal to 50%.

39. The positive electrode according to claim 32, wherein said composition contains:
(1) for the main mixture A+B+C+D:
(A) at least 86% by weight, relative to the weight of the mixture A+B+C, of cathode active substance of structure $LiM_mO_{2m}$, where $M_m$ is Ni, Co, or Mn when m is equal to 1 or $Mn_2$ when m is equal to 2;
(B) no more than 8% by weight, relative to the weight of the mixture A+B+C, of conductive filler in powder form comprising carbon and having a graphite/AB mixture of weight ratio in the range 4/1 to 1/4;
(C) no more than 6% by weight, relative to the weight of the mixture A+B+C, of polymer binder prepared from VF2, said binder being PVDF or VF2/HFP; and
(D) the solvent of said binder, in a quantity sufficient for the mixture A+B+C+D+E to have viscosity lying in the range 2 Pa.s to 20 Pa.s, under atmospheric pressure and at ambient temperature; and
(2) the salt resulting from the reaction between the free lithium hydroxide and
(E) said organic acid compound in a quantity corresponding to an NR greater than or equal to 50%.

40. The storage cell according to claim 32, wherein said composition has a pot-life greater than or equal to 24 hours in air and greater than or equal to 72 hours when protected from air.

41. The storage cell according to claim 33, wherein said neutralization rate lies in the range 100% to 150%.

42. The storage cell according to claim 36, wherein said ethylenically unsaturated fluorine-containing monomer compound is hexafluoropropylene.

43. The positive electrode according to claim 39, wherein said viscosity lies in the range 5 Pa.s to 7 Pa.s.

* * * * *